United States Patent
Lee

(10) Patent No.: US 11,164,565 B2
(45) Date of Patent: Nov. 2, 2021

(54) UNSUPERVISED LEARNING SYSTEM AND METHOD FOR PERFORMING WEIGHTING FOR IMPROVEMENT IN SPEECH RECOGNITION PERFORMANCE AND RECORDING MEDIUM FOR PERFORMING THE METHOD

(71) Applicant: LG ELECTRONICS INC., Seoul (KR)

(72) Inventor: Jeehye Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 122 days.

(21) Appl. No.: 16/561,651

(22) Filed: Sep. 5, 2019

(65) Prior Publication Data

US 2019/0392818 A1    Dec. 26, 2019

(30) Foreign Application Priority Data

Jul. 31, 2019    (KR) .......................... 10-2019-0093553

(51) Int. Cl.
*G10L 15/14*    (2006.01)
*G06N 20/00*    (2019.01)
(Continued)

(52) U.S. Cl.
CPC ............ *G10L 15/144* (2013.01); *G06N 20/00* (2019.01); *G10L 15/01* (2013.01); *G10L 15/16* (2013.01)

(58) Field of Classification Search
CPC ....... G10L 15/144; G10L 15/01; G10L 15/16; G06N 20/00
(Continued)

(56) References Cited

U.S. PATENT DOCUMENTS 7,725,408 B2 * 5/2010 Lee .......................... G06F 40/44
706/12
9,202,458 B2 * 12/2015 Braho .................... G10L 15/065
(Continued)

FOREIGN PATENT DOCUMENTS

KR    10-2014-0035164 A    3/2014
KR    10-2016-0059265 A    5/2016
(Continued)

*Primary Examiner* — Susan I McFadden
(74) *Attorney, Agent, or Firm* — Birch, Stewart, Kolasch & Birch, LLP

(57) ABSTRACT

A learning system and method for updating recognition performance by assigning weights according to a confidence level of data are discussed. The unsupervised learning system includes a memory configured to store speech data received from a server that performs speech recognition; and a processor configured to measure confidence levels of pieces of learnable data stored in the memory and classify the pieces of learnable data into learning data and adaptation data, generate a learning model by performing unsupervised learning on the learning data, generate an adaption model using the adaptation data, and evaluate speech recognition performance for the learning model and the adaptation model, wherein the processor is configured to assign weights by applying the measured confidence levels to the learning model and the adaptation model and update recognition performance with the learning model and the adaptation model to which the weights are applied.

13 Claims, 10 Drawing Sheets

(51) Int. Cl.
  *G10L 15/16*   (2006.01)
  *G10L 15/01*   (2013.01)
(58) Field of Classification Search
  USPC ........................................................ 704/256
  See application file for complete search history.

(56) References Cited

U.S. PATENT DOCUMENTS

| | | | |
|---|---|---|---|
| 9,514,126 B2* | 12/2016 | Riccardi | G10L 15/02 |
| 9,514,176 B2* | 12/2016 | Hieda | G06F 16/23 |
| 9,761,247 B2* | 9/2017 | Shriberg | G10L 25/60 |
| 10,424,289 B2* | 9/2019 | Kalinli-Akbacak | G10L 25/03 |
| 10,529,321 B2* | 1/2020 | Shriberg | G10L 15/22 |
| 10,621,522 B2* | 4/2020 | Bansal | G06N 5/025 |
| 10,916,240 B2* | 2/2021 | Lee | G06N 3/088 |
| 10,943,583 B1* | 3/2021 | Gandhe | G10L 15/18 |
| 2010/0169093 A1 | 7/2010 | Washio | |
| 2012/0323573 A1 | 12/2012 | Yoon et al. | |
| 2015/0046159 A1 | 2/2015 | Hakkani-Tur et al. | |

FOREIGN PATENT DOCUMENTS

| | | |
|---|---|---|
| KR | 10-2017-0086233 A | 7/2017 |
| WO | WO 2015/102127 A1 | 7/2015 |

\* cited by examiner

UNSUPERVISED LEARNING SYSTEM AND METHOD FOR PERFORMING WEIGHTING FOR IMPROVEMENT IN SPEECH RECOGNITION PERFORMANCE AND RECORDING MEDIUM FOR PERFORMING THE METHOD

CROSS-REFERENCE TO RELATED APPLICATIONS

This application claims priority to Korean Patent Application No. 10-2019-0093553 filed on Jul. 31, 2019 in Korea, the entire contents of which are hereby incorporated by reference in its entirety.

BACKGROUND

The present invention relates to an unsupervised learning system and method for performing weighting for improvement in speech recognition performance, and more particularly, to a learning system and method for updating recognition performance by assigning weights according to a confidence level of data.

A speech recognizer is increasingly being used in embedded systems as the performance of mobile devices is improved.

Since the speech recognizer needs to deal with many parameters and large vocabulary of acoustic models, techniques to reduce computational cost in a recognition process have been studied.

In general, the speech recognizer varies greatly in recognition performance depending on surrounding environments and speakers. Existing active learning methods require manual transcription of speech data, which consumes a lot of time and money.

In addition, the use of unselected data increases the learning time.

In addition, the existing active learning method use only one of a learning method and an adaptation method, and thus there is a limitation in improvement of speech recognition performance in a real environment.

In addition, there is a disadvantage that a person directly configures a test set to evaluate the performance of a generated model through direct intervention.

In this regard, U.S. Pat. No. 8,024,190 has been proposed. In the case of U.S. Pat. No. 8,024,190, manual transcription is used in the process of transcription of sampled speech data.

However, in the prior art, when performance of speech recognition of a trained model is evaluated, a person directly evaluates the performance of the speech recognition, which causes a lot of time and cost.

SUMMARY

An object of the present invention is to improve speech recognition performance by training a speech recognition model with data of an actual use environment for speech recognition.

Another object of the present invention is to automatically generate an acoustic model and evaluate the performance of the generated acoustic model at regular intervals without human intervention.

In order to achieve the above object, the present invention includes a memory configured to store speech data received from a server that performs speech recognition; and a processor configured to measure confidence levels of pieces of learnable data stored in the memory and classify the pieces of learnable data into learning data and adaptation data, generate a learning model by performing unsupervised learning on the learning data, generate an adaption model using the adaptation data, and evaluate speech recognition performance for the learning model and the adaptation model.

According to an embodiment, the processor may assign weights by applying the measured confidence levels to the learning model and the adaptation model and update recognition performance with the learning model and the adaptation model to which the weights are applied.

According to an embodiment, the processor may classify the learnable data into the learning data when the confidence level of the learnable data is greater than or equal to a reference confidence level, and classify the learnable data into the adaptation data when the confidence level of the learnable data is less than the reference confidence level.

According to an embodiment, the processor may select N pieces of data, each of which a hidden Markov model-state entropy is greater than a reference entropy, among learning data with a confidence level greater than or equal to the reference confidence level, perform unsupervised learning by using the selected N pieces of data and previously-stored seed data, and generate the learning model according to a result of the performance of the unsupervised learning.

According to an embodiment, the processor may generate the adaptation model using a generative adversarial network for adaptation data with a confidence level less than the reference confidence level.

According to an embodiment, the processor may further include a performance evaluation model configured to evaluate performance of the learning model and the adaptation model, the performance evaluation model may measure a first performance evaluation value indicating a number of successes of speech recognition in which the learning model is applied to logging speech data and a second performance evaluation value indicating a number of successes of speech recognition in which the adaptation model is applied to logging speech data, and select a model corresponding to a larger performance evaluation value of the first performance evaluation value and the second first performance evaluation value among the learning model and the adaptation model.

According to an embodiment, the processor may compare a performance evaluation value of the selected model with a performance evaluation value of an acoustic model stored previously, and update the acoustic model with the selected model when the performance evaluation value of the selected model is larger than the performance evaluation value of an acoustic model.

According to an embodiment, the processor may calculate new learning data or new adaptation data by applying weights according to confidence levels to the learning data or the adaptation data, generate the learning data through the new learning data, and generate the adaptation model through the new adaptation data.

According to an embodiment, the processor may update a performance evaluation model with the learning model or the adaptation model to which the weights are applied.

Further, the present invention provides an unsupervised learning method for performing weighting for improvement in speech recognition performance including measuring confidence levels of pieces of learnable data of speech data received from a server that performs speech recognition and stored; classifying the pieces of learnable data according to the measured confidence levels into learning data or adaptation data; generating a learning model by performing unsupervised learning on the learning data and generating an adaptation model using the adaptation data; and evaluate speech recognition performance for the learning model and the adaptation model.

The present invention may further include assigning weights by applying the measured confidence levels to the learning model and the adaptation model; and updating the speech recognition performance with the learning model or the adaptation model to which the weights are applied.

According to an embodiment, the classifying of the pieces of learnable data may include classifying the learnable data into the learning data when the measured confidence level is greater than or equal to a reference confidence level, and classifying the learnable data into the adaptation data when the measured confidence level is less than the reference confidence level.

According to an embodiment, the generating of the learning model may include selecting N pieces of data of which hidden Markov model-state entropy is greater than a reference entropy, among learning data with confidence level greater than or equal to the reference confidence level, performing unsupervised learning by using the selected N pieces of data and previously-stored seed data, and generating the learning model according to a result of performance of the unsupervised learning.

According to an embodiment, the generating of the adaptation model may include generating the adaptation model using a generative adversarial network for adaptation data with confidence level less than the reference confidence level.

According to an embodiment, the evaluating of the recognition performance may include measuring a first performance evaluation value indicating a number of successes of speech recognition in which the learning model is applied to logging speech data and a second performance evaluation value indicating a number of successes of speech recognition in which the adaptation model is applied to logging speech data, and selecting a model corresponding to a larger performance evaluation value of the first performance evaluation value and the second first performance evaluation value among the learning model and the adaptation model.

The unsupervised learning method may further include comparing a performance evaluation value of the selected model with a performance evaluation value of an acoustic model stored previously, and updating the acoustic model with the selected model when the performance evaluation value of the selected model is larger than the performance evaluation value of an acoustic model.

Further, the present invention provides a recoding medium in which an unsupervised learning method for performing weighting for improvement in speech recognition performance, wherein the unsupervised learning method includes measuring confidence levels of pieces of learnable data; classifying the pieces of learnable data according to the measured confidence levels into learning data or adaptation data; generating a learning model by performing unsupervised learning on the learning data; generating an adaption model using the adaptation data; and evaluating speech recognition performance for the learning model and the adaptation model.

DETAILED DESCRIPTION OF THE PREFERRED EMBODIMENTS

Figure 1:
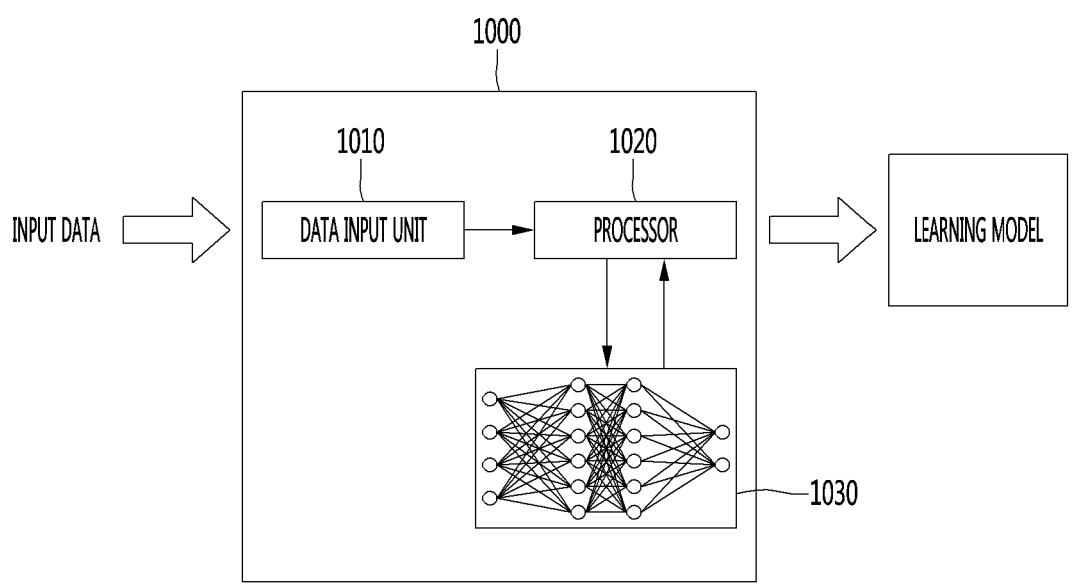
FIG. 1 is a block diagram for describing a learning apparatus of an artificial neural network.

Exemplary embodiments of the present invent on will be described below in detail with reference to accompanying drawings in which the same reference numbers are used throughout this specification to refer to the same or like parts. In describing the present invention, a detailed description of known functions and configurations will be omitted when it may obscure the subject matter of the present invention.

Hereinafter, exemplary embodiments of the present invention will be described in detail with reference to the accompanying drawings. However, it will be understood that the present invention is by no means restricted or limited in any manner by these exemplary embodiments. Like reference numerals in the drawings denote members that perform substantially the same function.

The objects and effects of the present invention may be naturally understood or more apparent from the following description, and the objects and effects of the present invention are not limited only by the following description. In addition, in describing the present invention, when it is determined that the detailed description of the known technology related to the present invention may unnecessarily obscure the gist of the present invention, the detailed description thereof will be omitted.

Artificial intelligence is a field of computer engineering and information technology that research a method for allowing computers to do thinking, learning, self-development or the like that can be done by human intelligence, and means that computers is allowed to imitate human intelligent behavior.

In addition, artificial intelligence does not exist by itself, but is directly or indirectly related to other fields of computer science. Especially, artificial intelligent factors have been introduced in the various field of information technology, and it has been actively attempted to utilize them to solve problems in the field.

Machine learning is a field of research that gives computers ability to learn without explicit programming, as a branch of artificial intelligence.

Specifically, machine learning is a technique for researching and building a system that performs learning based on empirical data, performs predictions, and improves its own performance, and algorithms therefor. The algorithms in machine learning take a way of building specific models to derive predictions or decisions based on input data, rather than performing strictly defined static program instructions.

Many machine learning algorithms have been developed on how to classify data in machine learning. Decision trees, Bayesian networks, support vector machines (SVMs), and artificial neural networks are typical.

The decision trees are analytical methods that perform classification and prediction by charting decision rules in a tree structure.

The Bayesian networks are models that represent probabilistic relationships (conditional independence) between multiple variables in a graphical structure. The Bayesian networks may be suited for data mining through unsupervised learning.

The support vector machine is a model of supervised learning for pattern recognition and material analysis, and is mainly used for classification and regression analysis.

The Artificial Neural Network (ANN) is a model of the connection between neurons and the principle of operation of biological neurons and is an information processing system in which a plurality of neurons called nodes or processing elements are connected in the form of a layer structure.

The Artificial Neural Network (ANN) is a model used in machine learning and an a statistical learning algorithm inspired by biological neural networks (especially the brain of the animal's central nervous system) in machine learning and cognitive science.

In detail, the artificial neural network (ANN) may refer to a model in which artificial neurons (nodes) constituting a network by synaptic coupling change connection strengths of synapses through learning to have a problem solving ability.

The term "artificial neural network (ANN)" may be used interchangeably with the term "neural network".

The artificial neural network (ANN) may include a plurality of layers, and each of the layers may include a plurality of neurons. In addition, the artificial neural network (ANN) may include a synapse connecting neurons.

The artificial Neural Network (ANN) may be generally defined by the following factors: (1) patterns of connections between neurons of different layers, (2) a learning process of updating weights of connections, and (3) an activation function that takes a weighted sum of inputs received from previous layers to generate an output value.

The Artificial Neural Networks (ANN) may include network models with the same schemes as a Deep Neural Network (DNN), a Recurrent Neural Network (RNN), a Bidirectional Recurrent Deep Neural Network (BRDNN), a Multilayer Perceptrons (MLP), and a Convolutional Neural Network (CNN), but is not limited thereto.

The Artificial Neural Networks (ANNs) are classified into a Single Layer Neural Network and a MultiLayer Neural Network according to the number of layers.

A typical single layer neural network consists of an input layer and an output layer.

Also, a typical multilayer neural network consists of an input layer, a hidden layer and an output layer.

The input layer is a layer that receives external materials. The number of neurons in the input layer is equal to the number of input variables. The hidden layer is located between the input layer and the output layer and receives signals from the input layer, extracts a feature, and transfers the same to the output layer. The output layer receives a signal from the hidden layer and outputs it to the outside.

The input signals between neurons are respectively multiplied by connection strengths with a value between 0 and 1, and then summed. When the sum is greater than a threshold of the neuron, the neuron is activated and implemented as an output value through an activation function.

Meanwhile, a deep neural network (DNN), which includes a plurality of hidden layers between an input layer and an output layer, is a representative artificial neural network that implements deep learning that is a kine of the machine learning technology.

The Artificial Neural Network (ANN) may be trained using training data. Herein, training may refer to a process of determining a parameter of the artificial neural network (ANN) using training data in order to perform classification, regression, clustering, or the like on input data. Representative examples of the parameter of the artificial neural network (ANN) may include weights assigned to synapses and biases applied to neurons.

The artificial neural network trained by the training data may classify or cluster the input data according to a pattern of the input data.

Herein, the artificial neural network trained using the training data may be referred to as a trained model.

A learning method of the Artificial Neural Network (ANN) will be described below.

The learning method of the Artificial Neural Network (ANN) may be broadly classified into supervised learning, unsupervised learning, semi-supervised learning, and reinforcement learning.

The supervised learning is a kind of machine learning to infer a function from training data.

Among inferred functions as described above, to output a continuous value may refer to regression, and to predict and output a class of an input vector may refer to a classification.

In the supervised learning, an artificial neural network (ANN) is trained in a state where a label for training data is given.

Here, the label means a correct answer (or result value) that the artificial neural network (ANN) should infer when the training data is input to the artificial neural network (ANN).

In the present specification, when training data is input, the correct answer (or result value) that an artificial neural network (ANN) should infer is referred to as a label or labeling data.

Herein, giving the training data with a label for learning of the artificial neural network (ANN) is referred to as labeling the training data with the labeling data.

In this case, the training data and a label corresponding to the training data constitute one training set, and may be input to the artificial neural network (ANN) in the form of the training set.

On the other hand, the training data represents a plurality of features, and the labeling of the training data with labels means may mean that the features represented by the training data are given with labels. In this case, the training data may represent a feature of an input object in a vector form.

The artificial neural network (ANN) may infer a function of the correlation between the training data and the labeling data using the training data and the labeling data. In addition, the artificial neural network (ANN) may determine (optimize) the parameters of the artificial neural network (ANN) by evaluating the inferred function.

The unsupervised Learning is a kind of machine learning and does not have a label for training data.

Specifically, the unsupervised learning may be a learning method for learning artificial neural networks to find out and classify patterns in the training data itself, rather than correlations between training data and labels corresponding to the training data.

Examples of the unsupervised learning may include clustering and independent component analysis.

Examples of artificial neural networks using the unsupervised learning may include a generative adversarial network (GAN) and an autoencoder (AE).

The Genetic Adversarial Network (GAN) is a machine learning method in which two different artificial intelligences, a generator and a discriminator, compete with each other and improve performance.

In this case, the generator is a model for creating new data, and may generate new data based on original data.

In addition, the discriminator is a model for recognizing a pattern of data, and may discriminate the authenticity of the new data generated by the generator based on the original data.

The generator receives and learns data that has not tricked the discriminator, and the discriminator may receive and learn fake data deceived from the generator. Accordingly, the generator may evolve to trick the discriminator as well as possible, and may evolve to distinguish the original data of the discriminator from the data generated by the generator.

The autoencoder (AE) is a neural network that aims to reproduce the input itself as an output.

The autoencoder (AE) includes an input layer, a hidden layer and an output layer, and the input data passes through the input layer and enters the hidden layer.

In this case, since the number of nodes in the hidden layer is smaller than the number of nodes in the input layer, the dimension of the data is reduced, and thus compression or encoding is performed.

Also, data output from the hidden layer enters the output layer. In this case, since the number of nodes in the output layer is larger than the number of nodes in the hidden layer, the dimension of the data is increased, and thus decompression or decoding is performed.

On the other hand, the autoencoder (AE) adjusts the connection strength of neurons through learning so that the input data is expressed as hidden layer data. In the hidden layer, information is represented by the smaller number of neurons than that in the input layer, and reproducing the input data as an output may mean that the hidden layer has found and expressed a hidden pattern from the input data.

The semi-supervised learning is a kind of machine learning, which may mean a learning method that uses both labeled training data and unlabeled training data.

One of schemes of the semi-supervised learning is to infer a label of unlabeled training data and then perform learning using the inferred label, which is useful when labeling cost is high.

The reinforcement learning is a theory capable of finding out the best way by experience without data when an environment where an agent can determine what to do every moment is given.

The reinforcement Learning may be performed mainly by the Markov Decision Process (MDP).

In the Markov Decision Process (MDP), firstly, an environment where the information necessary for an agent to perform the next action is given, and second, how the agent behaves in that environment is defined, thirdly, it is defined to give reward for what the agent does well and give penalty for what the agent do not well, and fourthly, the best policy is derived by repeat the experience until the future reward reaches the highest point.

FIG. 1 is a block diagram for describing a learning apparatus of an artificial neural network.

Referring to FIG. 1, a learning apparatus 1000 of an artificial neural network may include a data input unit 1010, a processor 1020, and an artificial neural network 1030.

The data input unit 1010 may receive input data. In this case, the data input unit 1010 may receive training data, or may receive raw data.

When the data input unit 1010 receives raw data, the processor 1020 may pre-process the received data to generate training data that may be input to the artificial neural network 1030.

The artificial neural network 1030 may be implemented in hardware, software, or a combination of hardware and software, and when a part or whole of the artificial neural network 1030 is implemented in software, one or more instructions constituting the artificial neural network 1030 may be stored in a memory (not shown) included in the learning apparatus 1000 of the artificial neural network.

The processor 1020 may train the artificial neural network 1030 by inputting training data or a training set to the artificial neural network 1030.

Specifically, the processor 1020 may repeatedly learn the artificial neural network (ANN) using various learning techniques described above to determine (optimize) a parameter of the artificial neural network (ANN).

Here, the artificial neural network whose parameters are determined by being trained using the training data may be referred to as a trained model.

On the other hand, a trained model may be used to infer result values for new input data rather than training data.

On the other hand, the trained model may infer a result value while being mounted on the learning apparatus 1000 of the artificial neural network, or may be transmitted to and mounted on another device.

When transmitting a trained model to another device, the learning apparatus 1000 of the artificial neural network may include a communication unit (not shown) for communicating with the another device.

Figure 2:
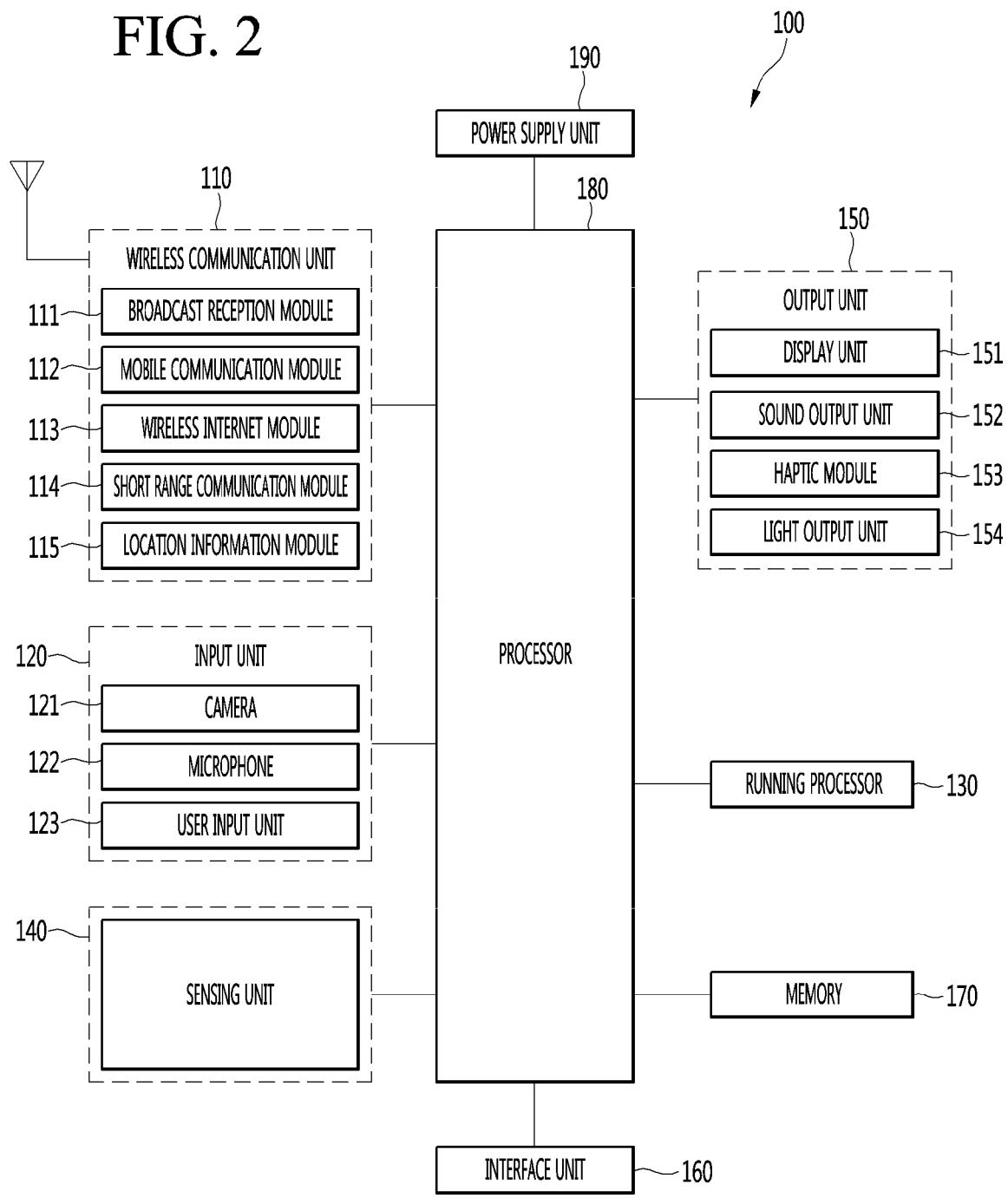
FIG. 2 is a block diagram for describing a configuration of an unsupervised learning system for performing weighting for improvement in speech recognition performance according to an embodiment of the present invention.

FIG. 2 is a block diagram for describing a configuration of an unsupervised learning system for performing weighting for improvement in speech recognition performance according to an embodiment of the present invention.

Learning systems described herein may include mobile phones, smart phones, laptop computers, digital broadcasting terminals, personal digital assistants (PDAs), portable multimedia players (PMPs), navigation, slate PCs, Tablet PCs, ultrabooks, wearable devices, such as smartwatches, smart glass, or head mounted displays, and the like.

However, the learning system 100 according to the embodiments described herein may be applied to a fixed terminal such as a smart TV, a desktop computer, a digital signage, or the like.

In addition, the learning system 100 according to an embodiment of the present invention may be applied to a fixed or mobile robot. The learning system 100 according to an embodiment of the present invention may perform a function of a speech agent. The speech agent may be a program that recognizes a user's speech and outputs a response suitable for the recognized user's speech with speech.

The learning system 100 may include a wireless communication unit 110, an input unit 120, a running processor 130, a sensing unit 140, an output unit 150, an interface unit 160, a memory 170, and a processor 180, and a power supply unit 190.

A trained model may be mounted on the learning system 100.

On the other hand, the trained model may be implemented in hardware, software, or a combination of hardware and software, and, when a part or whole of the trained model is implemented in software, one or more instructions constituting the trained model may be stored in memory 170.

The wireless communication unit 110 may include at least one of a broadcast receiving module 111, a mobile communication module 112, a wireless Internet module 113, a short range communication module 114, and a location information module 115.

The broadcast receiving module 111 receives a broadcast signal and/or broadcast-related information from an external broadcast management server through a broadcast channel.

The mobile communication module 112 may transmit/receive a radio signal to/from at least one of a base station, an external terminal, and a server on a mobile communication network which is established according to a technical standard or a communication scheme for mobile communication (e.g., Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), or LTE-A (Long Term Evolution-Advanced) and the like The wireless Internet module 113 refers to a module for wireless Internet access and may be provided inside or outside the learning system 100. The wireless Internet module 113 is configured to transmit and receive wireless signals in communication networks according to wireless Internet technologies.

Examples of wireless Internet technologies include Wireless LAN (WLAN), Wireless-Fidelity (Wi-Fi), Wi-Fi Direct, Digital Living Network Alliance (DLNA), Wireless Broadband (WiBro), WiMAX (World Interoperability for Microwave Access (HSDPA), High Speed Downlink Packet Access (HSDPA), High Speed Uplink Packet Access (HSUPA), Long Term Evolution (LTE), and Long Term Evolution-Advanced (LTE-A).

The short range communication module 114 may support short-range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi Direct, and Wireless USB (Wireless Universal Serial Bus) technologies.

The location information module 115 is a module for obtaining a location (or current location) of a mobile terminal, and a representative example thereof is a Global Positioning System (GPS) module or a Wireless Fidelity (WiFi) module. For example, when the terminal utilizes the GPS module, the terminal may acquire the location of the mobile terminal using a signal transmitted from a GPS satellite.

The input unit 120 may include a camera 121 for inputting an image signal, a microphone 122 for receiving an audio signal, and a user input unit 123 for receiving information from a user.

The speech data or image data collected by the input unit 120 may be analyzed and processed as a control command of the user.

The input unit 120 is for inputting image information (or signal), audio information (or signal), data, or information input from a user. In order to input image information, the learning system 100 may include one or a plurality of cameras 121.

The camera 121 processes image frames such as still images or moving images obtained by an image sensor in a video call mode or a photographing mode. The processed image frames may be displayed on the display unit 151 or stored in the memory 170.

The microphone 122 processes external sound signals as electrical speech data. The processed speech data may be utilized in various ways according to a function (or a running application program) being performed in the learning system 100. Meanwhile, various noise reduction algorithms may be implemented in the microphone 122 to remove noise occurring in the process of receiving an external sound signal.

The user input unit 123 is for receiving information from a user, and when information is input through the user input unit 123, the processor 180 may control an operation of the learning system 100 so as to correspond to the input information.

The user input unit 123 may include a mechanical input unit (or a mechanical key, for example, a button, a dome switch, a jog wheel, or a jog switch located at the front, rear, or side of the learning system 100) and touch input means. As an example, the touch input means may include a virtual key, a soft key, or a visual key displayed on the touch screen through software processing, or a touch key disposed in the other portion than the touch screen.

The learning processor 130 may be configured to receive, classify, store, and output information to be used for data mining, data analysis, intelligent decision making, and machine learning algorithms and techniques.

The running processor 130 may include one or more memory units configured to store data received, detected, sensed, generated, predefined or outputted by the terminal, data received, detected, sensed, generated, predefined or outputted in another method, or data outputted by another component, another device, another terminal or an apparatus communicating with the terminal.

The running processor 130 may include a memory integrated or implemented in the terminal. In some embodiments, the running processor 130 may be implemented using the memory 170.

Alternatively or additionally, the running processor 130 may be implemented using a memory associated with the terminal, such as an external memory directly coupled to the terminal, or a memory maintained in a server communicating with the terminal.

In other embodiments, the running processor 130 may be implemented using a memory maintained in a cloud computing environment or other remote memory locations accessible by the terminal via a communication scheme such as a network.

The learning processor 130 may be configured to store data in one or more databases to identify, index, categorize, manipulate, store, search, and output data for use in supervised or unsupervised learning, data mining, predictive analytics, or other machines.

The information stored in the running processor 130 may be utilized by the processor 180 or one or more other controllers of the terminal using any of a variety of different types of data analysis algorithms and machine learning algorithms.

Examples of such algorithms include k-near neighbor systems, fuzzy logic (e.g. probability theory), neural networks, Boltzmann machines, vector quantization, pulse neural networks, support vector machines, maximum margin classifiers, hill climbing, inductive logic system Bayesian networks, Peritnet (e.g., Finite State Machine, Mealy Machine, Moore Finite State Machine), Classifier Tree (e.g., Perceptron Tree, Support Vector Tree, Markov Tree, Decision Tree Forest, or Random Forest), Stake Models and Systems, Artificial fusion, sensor fusion, image fusion, reinforcement learning, augmented reality, pattern recognition, automated planning, and the like.

The processor 180 may determine or predict at least one executable operation of the terminal based on the determined or generated information using data analysis and machine learning algorithms. To this end, the processor 180 may request, search, receive, or utilize data of the learning processor 130. The processor 180 may control the terminal so as to execute a predicted operation or an operation determined to be desirable among the at least one executable operation.

The processor 180 may perform various functions for implementing intelligent emulation (that is, a knowledge based system, an inference system, and a knowledge acquisition system). This may be applied to various types of systems (e.g., fuzzy logic systems), including adaptive systems, machine learning systems, artificial neural networks, and the like.

The processor 180 may include a sub-module that enables operation involving speech and natural language speech processing, such as I/O processing modules, environmental condition modules, speech-text (STT) processing modules, natural language processing modules, workflow processing modules, and service processing modules.

Each of these sub-modules may have access to one or more systems or data and models or a subset or superset thereof in the terminal. In addition, each of these submodules may provide various functions, including lexical indexes, user data, workflow models, service models, and automatic speech recognition (ASR) systems.

In other embodiments, other aspects of the processor 180 or terminal may be implemented in the submodule, system, or data and model.

In some examples, based on the data of running processor 130, processor 180 may be configured to detect and detect requirements based on contextual conditions expressed in user input or natural language input or the intention of the user.

The processor 180 can actively derive and obtain the information needed to fully determine the requirements based on contextual conditions or the user's intent. For example, the processor 180 can actively derive the information needed to determine requirements by analyzing historical data, including historical input and output, pattern matching, unambiguous words, input intent, and the like.

The processor 180 may determine a task flow for executing a function responsive to the requirement based on the context condition or the user's intention.

The processor 180 may collect, sense, extract, and detect and/or receive signals or data used for data analysis and machine learning operations through one or more sensing components in the terminal, in order to collect information for processing and storage in the running processor 130.

Information collection may include sensing information through a sensor, extracting information stored in the memory 170, or receiving information from another terminal, an entity, or an external storage device through communication means.

The processor 180 may collect and store usage history information in the terminal.

The processor 180 may determine the optimal matching to perform a particular function using the stored usage history information and predictive modeling The processor 180 may receive or sense surrounding environment information or other information through the sensor 140.

The processor 180 may receive a broadcast signal and/or broadcast related information, a wireless signal, and wireless data through the wireless communication unit 110.

The processor 180 may receive image information (or a corresponding signal), audio information (or a corresponding signal), data or user input information from the input unit 120.

The processor 180 may collect information in real time, process or classify the information (e.g., knowledge graphs, command policies, personalization databases, dialog engines, etc.) and store the processed information in the memory 170 or the running processor 130.

When the operation of the terminal is determined based on data analysis and machine learning algorithms and techniques, the processor 180 may control the components of the terminal to execute the determined operation. The processor 180 may control the terminal according to a control command to perform the determined operation.

The processor 180 may analyze historical information indicating the performance of a particular operation through data analysis and machine learning algorithms and techniques when the particular operation is performed, and perform update of previously learned information based on the analyzed information.

Accordingly, the processor 180 may improve the accuracy of future performance of data analysis and machine learning algorithms and techniques based on the updated information, in cooperation with the running processor 130.

The sensing unit 140 may include one or more sensors for sensing at least one of information in the mobile terminal, surrounding environment information of the mobile terminal, and user information.

For example, the sensing unit 140 may include at least one of a proximity sensor 141, an illumination sensor 142, a touch sensor, an acceleration sensor, a magnetic sensor, a G-sensor, a gyroscope sensor, a motion Sensor, an RGB Sensor, an infrared sensor, a finger scan sensor, a ultrasonic sensor, an optical sensor (e.g., the camera 121), a microphone 122, a battery gauge, an environmental sensor (e.g., a barometer, a hygrometer, a thermometer, a radiation detection sensor, a thermal sensor, a gas sensors, or the like), a chemical sensor (e.g., an electronic nose, a healthcare sensor, a biometric sensor, or the like). Meanwhile, the mobile terminal disclosed herein may combine pieces of information sensed by at least two or more of these sensors and use the same.

The output unit 150 is for generating an output related to sight, hearing, sight, hearing, touch, or the like, and may include at least one of a display unit 151, a sound output unit 152, a haptic module 153, and a light output unit 54.

The display unit 151 displays (outputs) information processed by the learning system 100. For example, the display unit 151 may display execution screen information of an application program driven in the learning system 100 or user interface (UI) or graphic user interface (GUI) information according to the execution screen information.

The display unit 151 may implement a touch screen in such a manner that the display unit 151 forms a layer structure with or is integrally formed with a touch sensor. Such a touch screen may function as a user input unit 123 that provides an input interface between the learning system 100 and the user and may provide an output interface between the learning system 100 and the user.

The sound output unit 152 may output audio data received from the wireless communication unit 110 or stored in the memory 170 in a call signal reception mode, a call mode, a recording mode, a speech recognition mode, a broadcast reception mode, or the like.

The sound output unit 152 may include at least one of a receiver, a speaker, and a buzzer.

The haptic module 153 generates various tactile effects that a user is able to feel. A representative example of the tactile effect generated by the haptic module 153 may be vibration.

The light output unit 154 outputs a signal for notifying occurrence of an event by using light of a light source of the learning system 100. Examples of events generated in the learning system 100 may include message reception, call signal reception, missed call, alarm, schedule notification, email reception, information reception through an application, and the like.

The interface unit 160 functions as a path to various types of external devices connected to the learning system 100. The interface unit 160 may include at least one of a wired/wireless headset port, an external charger port, a wired/wireless data port, a memory card port, a port for connection to a device equipped with an identification module, an audio input/output (I/O) port, a video input/output (I/O) port, and an earphone port. The learning system 100 may perform appropriate control related to a connected external device in response to the connection of the external device to the interface unit 160.

On the other hand, the identification module is a chip that stores a variety of information for authenticating the use authority of the learning system 100, and may include a user identity module (UIM), a subscriber identity module (SIM), a universal subscriber identity module (USIM) and the like. A device equipped with an identification module (hereinafter referred to as an 'identification device') may be manufactured in a smart card form. Therefore, the identification device may be connected to the learning system 100 through the interface unit 160.

The memory 170 stores data supporting various functions of the learning system 100.

The memory 170 stores a plurality of application programs (or applications) running in the learning system 100, data and instructions for operation of the learning system 100, and data for the learning processor 130 (e.g., at least one piece of algorithm information for machine learning).

The processor 180 typically controls the overall operation of the learning system 100 in addition to the operations associated with the application programs. The processor 180 may provide or process information or a function appropriate to a user by processing signals, data, information, and the like, which are input or output through the above-described components, or by executing an application program stored in the memory 170.

In addition, the processor 180 may control at least some of the components described with reference to FIG. 1 in order to execute an application program stored in the memory 170. In addition, the processor 180 may operate at least two or more of the components included in the learning system 100 in a combination thereof to execute the application program.

The power supply unit 190 receives power from an external power source or an internal power source under the control of the processor 180 to supply power to each component included in the learning system 100. The power supply unit 190 includes a battery, which may be a built-in battery or a replaceable battery.

As described above, the processor 180 controls the operations related to the application program, and the overall operation of the learning system 100, generally. For example, when a state of the mobile terminal satisfies a set condition, the processor 180 may execute or release a lock state that restricts input of a user's control command to applications.

Figure 3:
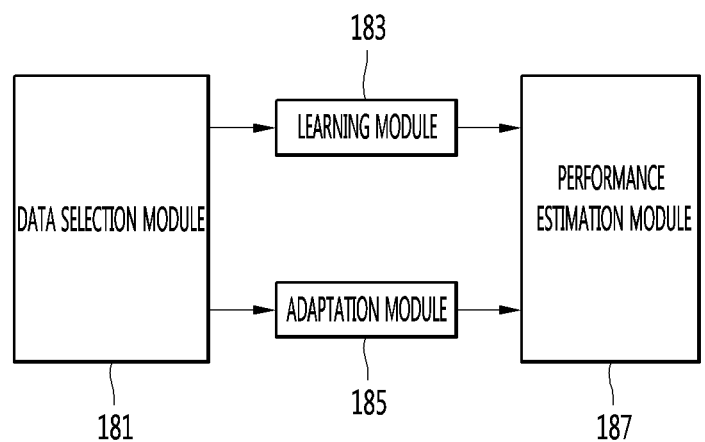
FIG. 3 is a diagram for describing a detailed configuration of a processor according to an embodiment of the present invention.

FIG. 3 is a diagram for describing a detailed configuration of a processor according to an embodiment of the present invention.

Referring to FIG. 3, a processor 180 according to an embodiment of the present invention may include a data selection module 181, a learning module 183, an adaptation module 185, and a performance estimation module 187.

The data selection module 181 may remove non-learnable data from a plurality pieces of data.

The data selection module 181 may measure confidence levels of the remaining learnable data after the non-learnable data is removed.

The processor 181 may classify the learnable data into learning data or adaptation data according to the measured confidence level.

The learning module 183 may perform unsupervised learning on the classified learning data to generate a learning model.

The processor 185 generates an adaptation model by using the classified adaptation data.

The adaptation module 185 may generate an adaptation model by modeling a probability distribution of the adaptation data using a machine learning algorithm capable of unsupervised learning such as a generative adversarial network.

A performance estimation module 187 may evaluate speech recognition performance of each of the generated learning model and the adaptation model.

Detailed description of the components constituting the processor 180 will be described later.

The components illustrated in FIG. 3 may be included in a processor 1020 of the learning apparatus 1000 described with reference to FIG. 1.

Figure 4:
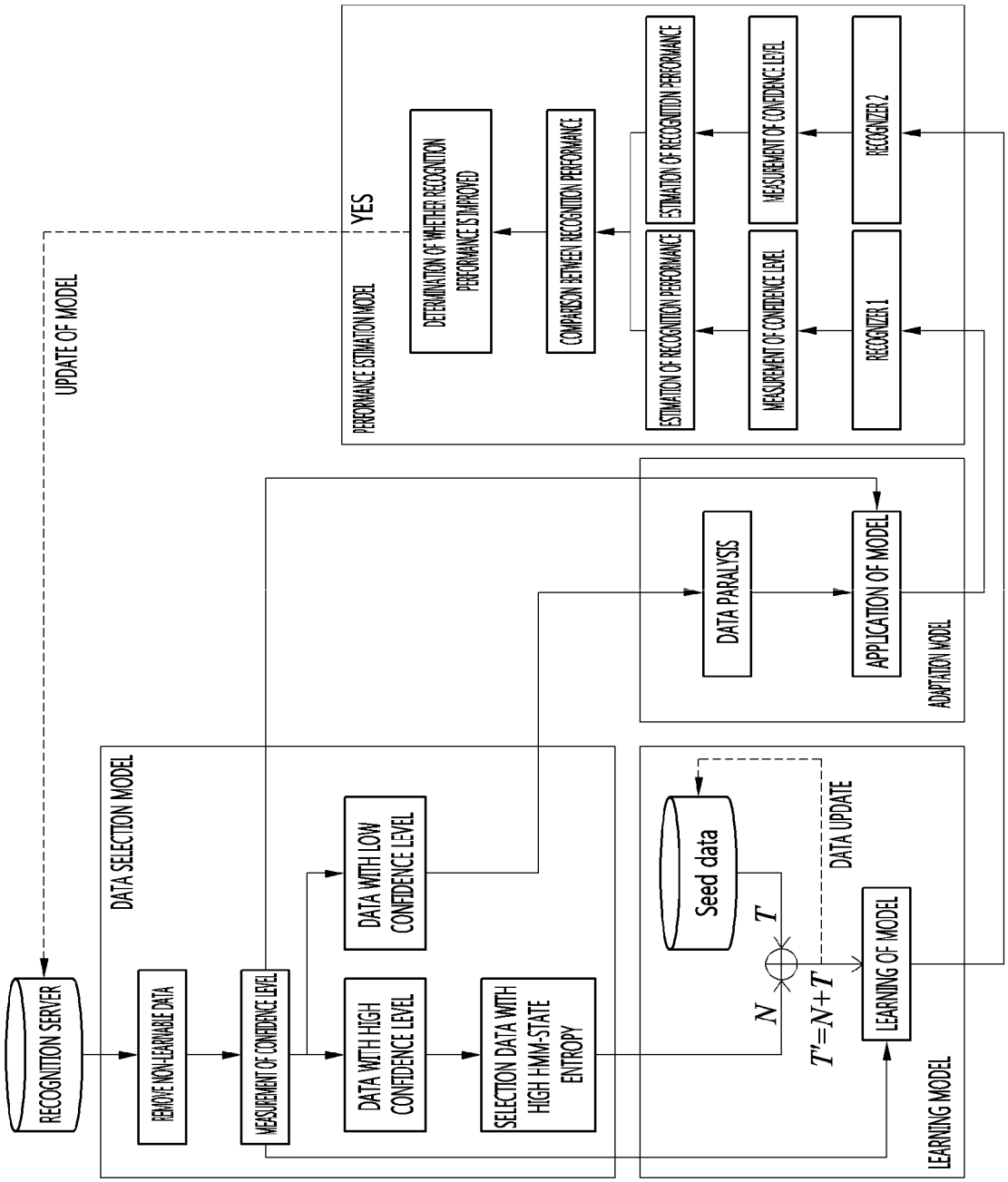
FIG. 4 illustrates an entire frame of an unsupervised learning system for performing weighting for improvement in speech recognition performance according to an embodiment of the present invention.

In this case, the embodiment of FIG. 4 may be performed by the processor 1020 of the learning apparatus 1000.

FIG. 4 illustrates an entire frame of an unsupervised learning system for performing weighing for improvement of performance of speech recognition according to an embodiment of the present invention.

Referring to FIG. 4, the present invention includes a data selection module 181, a learning module 183, an adaptation module 185, and a performance estimation module 187, and each of the modules perform processes of speech recognition to performance evaluation using a plurality of pieces of data.

The data selection module 181 removes non-learnable data and measures the confidence level of the remaining learnable data after removing the non-learnable data.

The data selection module 181 classifies the learnable data into learning data or adaptation data according to the measured confidence level, and generates a learning model by performing unsupervised learning on classified learning data.

The learning module 183 selects N pieces of data of which hidden Markov model-state entropy is greater than a reference entropy, among learning data. The learning module 183 performs unsupervised learning by using the selected N pieces of data and previously stored seed data.

The learning module 183 generates a new learning model learned through the unsupervised learning. The adaptation module 185 of the processor 180 generates an adaptation model using the classified adaptation data. A performance estimation module 187 of the processor 180 evaluates speech recognition performance of each of the generated learning model and the adaptation model.

Here, the processor assigns weights by applying the measured confidence level to the learning module 183 and the adaptation module 185, and updates the recognition performance of the performance estimation module 187 with the learning model and the adaptation model to which the weights are applied.

The processor 180 calculates new learning data or adaptation data by applying weights according to the confidence level to the learning data or the adaptation data, generates the learning model through the new learning data, and generates the adaptation model through the new adaptation data.

The processor 180 may transmit the confidence level calculated by the data selection module 181 to the learning module 185 and the adaptation module 185, and generate the learning model and the adaptation model by applying the transmitted weights.

The weight is assigned based on the confidence level calculated by the data learning model, and the higher the confidence level. The rate of reflection to a result value may be increased in data operation in the learning model and the adaptation model by increasing the weight as the confidence level is higher. This will be described in detail with reference to FIG. 7.

The performance estimation module 187 obtains a first performance evaluation value of the learning model and a second performance evaluation value of the adaptation model. The performance estimation module 187 compares the first performance evaluation value with the second performance evaluation value, and selects a model having a larger performance evaluation value among the learning model and the adaptation model as a model for determining whether to update.

The performance estimation module 187 determines whether the performance of a selected model is better than an existing acoustic model. The performance estimation module 187 may update the existing model according to a result of the evaluation of the speech recognition performance.

Figure 5:
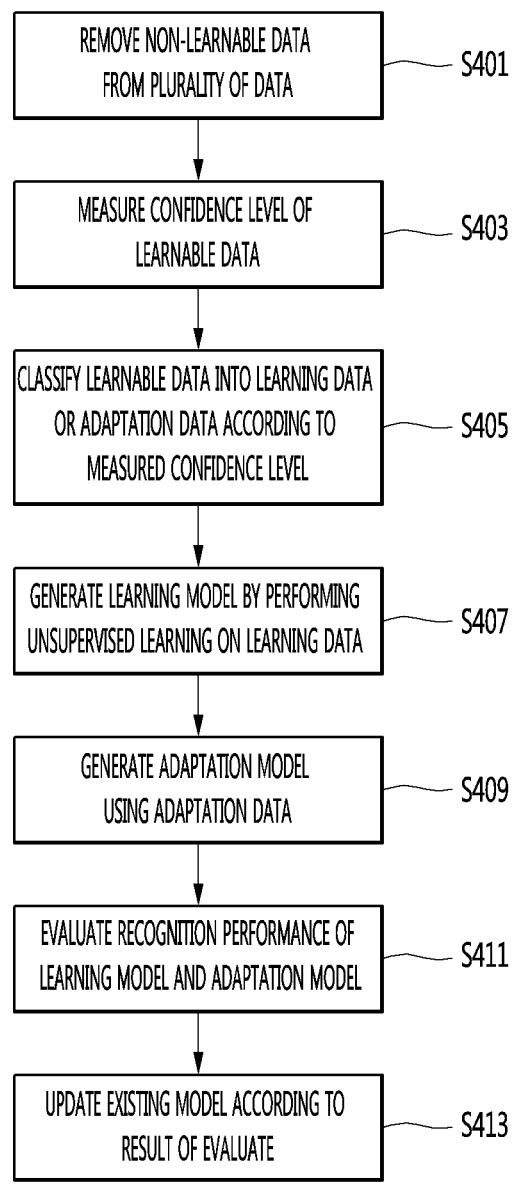
FIG. 5 is a flowchart for describing a method of operating a learning system according to an embodiment of the present invention.

FIG. 5 is a flowchart for describing a method of operating a learning system according to an embodiment of the present invention.

The data selection module 181 of the processor 180 removes non-learnable data from the plurality of pieces of data (S401).

In an embodiment, the data selection module 181 may receive a plurality of pieces of data from a speech recognition server. The speech recognition server may be a natural language processing (NLP) server that performs intention analysis.

In another embodiment, the data selection module 181 may obtain a plurality of pieces of data from the memory 170.

The data selection module 181 may remove non-speech data, multi-speaker speech data, and mis-recognition speech data from the plurality of pieces of data.

The data selection module 181 may identify non-speech data and multi-speaker speech data by using a power spectrum of each of the plurality of pieces of data.

When a frequency band of data is out of a speech frequency band of a speaker, the data selection module 181 may classify the data as non-speech data When the number of frequency bands of the data is greater than or equal to a preset number, the data selection module 181 may classify the data as multi-speaker speech data.

The data selection module 181 of the processor 180 measures a confidence level of the remaining learnable data after the non-learnable data is removed (S403).

In an embodiment, the data selection module 181 may measure the confidence level of the learnable data based on a confidence scoring method of <Recognition Confidence Scoring for Use in Speech Understanding Systems> which is the known paper.

The data selection module 181 of the processor 180 classifies the learnable data into learning data or adaptation data according to the measured confidence level (S405).

When the measured confidence level is equal to or greater than the reference confidence level, the data selection module 181 may classify the data into learning data.

The learning data may later be used to create a new learning model.

When the measured confidence level is less than the reference confidence level, the data selection module 181 may classify the data into adaptation data.

The adaptation data may later be used to generate an adaptation model.

The learning module 183 of the processor 180 performs unsupervised learning on the classified learning data to generate a learning model (S407).

A process of generating a learning model will be described with reference to FIG. 6.

Figure 6:
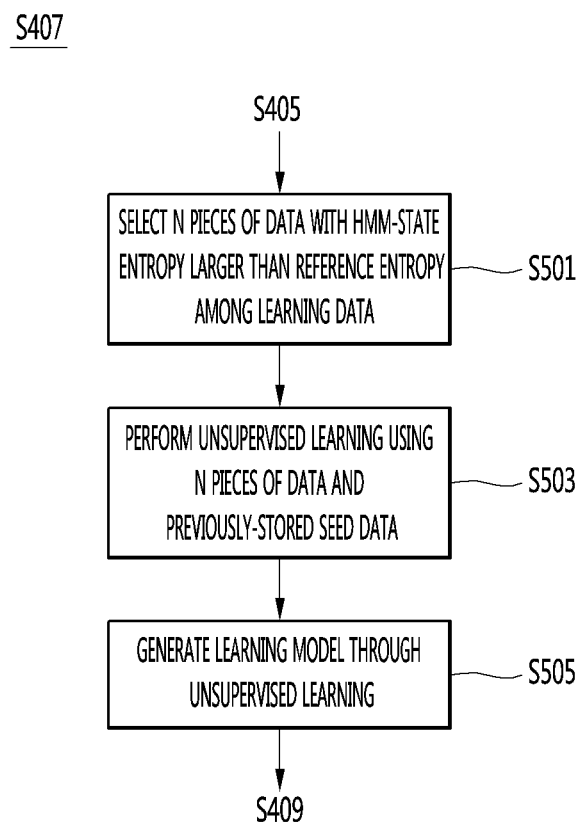
FIG. 6 is a diagram illustrating a process of generating a learning model according to an embodiment of the present invention.

FIG. 6 is a diagram illustrating a process of generating a learning model according to an embodiment of the present invention.

Referring to FIG. 6, the learning module 183 of the processor 180 selects N pieces of data of which hidden Markov model-state entropy is greater than a reference entropy, among learning data. (S501).

The Hidden Markov model-state entropy may have a larger value as the deviation of the number of phonemes constituting a syllable decreases. On the contrary, the Hidden Markov model-state entropy may be smaller as the deviation of the number of phonemes constituting the syllable is larger.

The learning module 183 performs unsupervised learning by using the selected N pieces of data and previously stored seed data (S503).

Unsupervised learning may be a method to train a learning model to find patterns and classify data in learning data itself.

The learning module 183 may obtain an association relationship between the N pieces of data and text data matching previously stored seed data.

The previously-stored seed data may be speech data that was used when the existing learning model was generated.

The learning module 183 generates a new learning model learned through unsupervised learning (S505).

The learning module 183 may generate a new learning model that stores associations between the N pieces of data and text data matching the previously-stored seed data.

According to the embodiment of FIG. 6, since speech data with a high confidence level and unsupervised learning are used, a result of the recognition of the speech data may be immediately used for learning without a manual labeling process.

The manual labeling means that a person directly transcribes (or types) text data corresponding to speech data.

Description will be given referring again to FIG. 5. The adaptation module 185 of the processor 180 generates an adaptation model by using classified adaptation data (S409).

The adaptation data is data with lower confidence level than learning data. The adaptation data may be speech data reflecting a practical environment because the confidence level is relatively lower than the learning data.

The adaptation module 185 may generate an adaptation model using a generative adversarial network (GAN) described with reference to FIG. 1 for the adaptation data.

The adaptation module 185 may generate an adaptation model by modeling a probability distribution of the adaptation data using a machine learning algorithm capable of unsupervised learning such as a generative adversarial network.

The performance estimation module 187 of the processor 180 evaluates speech recognition performance of each of the generated learning model and adaptation model (S411).

In an embodiment, the performance estimation module 187 may evaluate the speech recognition performance by measuring a performance evaluation value of a model applied to logging speech data obtained in the practical environment, in addition to the plurality of pieces of data used in step S401.

Here, the performance evaluation value may represent the degree of result of speech recognition in which the learning model is applied to the logging speech data. More specifically, the performance evaluation value may indicate the number of successes of speech recognition in which a learning model is applied to the logging speech data.

For example, in a case where the learning model is applied to the same logging speech data 100 times, when the number of successes of speech recognition is 90, the performance evaluation value may be determined as 90.

In detail, the performance estimation module 187 may apply a learning model to the logging data to measure a first performance evaluation value of the obtained recognition result.

In addition, the performance estimation module 187 may apply an adaptation model to the same logging data to measure a second performance evaluation value of the obtained recognition result.

The performance estimation module 187 may evaluate a model that provides a larger performance evaluation value among the first performance evaluation value and the second performance evaluation value as a model having better performance.

For example, the performance estimation module 187 may evaluate the learning model as a model having better performance when the first performance evaluation value is larger than the second performance evaluation value.

In contrast, the performance estimation module 187 may evaluate the adaptation model as a model having better performance when the second performance evaluation value is larger than the first performance evaluation value.

Figure 7:
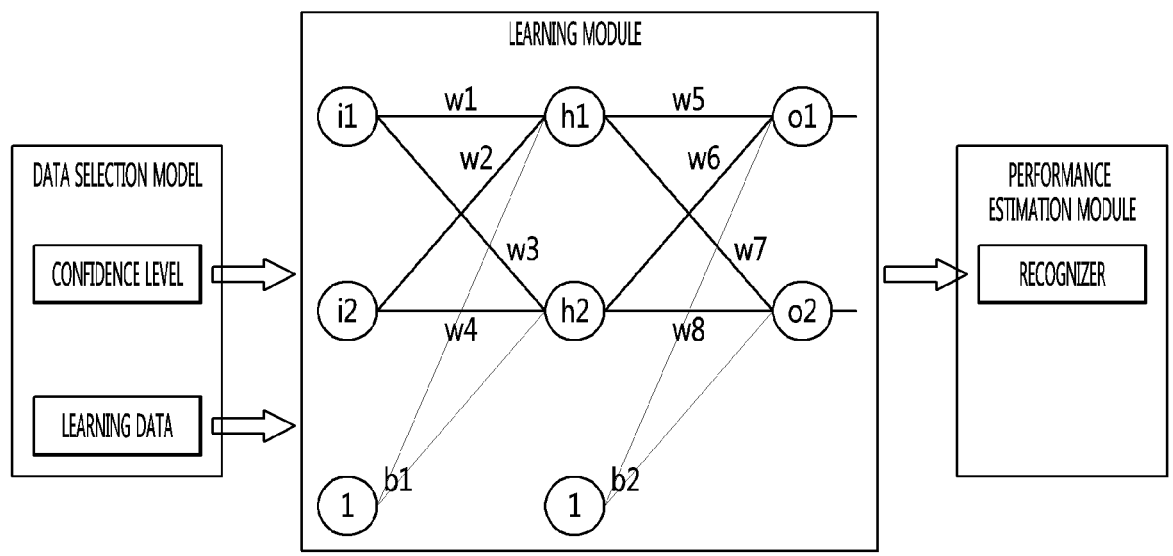
FIG. 7 is a diagram illustrating weighting a learning model or an adaptation model according to an embodiment of the present invention.

FIG. 7 is a diagram illustrating weighting a learning model or an adaptation model according to an embodiment of the present invention.

Referring to FIG. 7, the learning module 183 may update a performance estimation model by applying the above-described confidence level measurement result to the learnable data.

In this process, the following equations (1) to (4) may be applied.

$$net_{h1} = w_1 * i_1 + w_2 * i_2 + b_1 * 1 \quad \text{Equation (1)}$$

$$net_{o1} = w_5 * out_{h1} + w_6 * out_{h2} + b_2 * 1 \quad \text{Equation (2)}$$

$$out_{h1} = \frac{1}{1 + e^{-net_{h1}}} = \frac{1}{1 + e^{-0.3775}} \quad \text{Equation (3)}$$

$$out_{o1} = \frac{1}{1 + e^{-net_{o1}}} = \frac{1}{1 + e^{-1.105905967}} \quad \text{Equation (4)}$$

In order to apply the weights, weights according to the confidence may be assigned as in equation (6) below.

$$E_{total} = \sum \frac{1}{2}(\text{target} - \text{output})^2 = \quad \text{Equation (5)}$$

$$\frac{1}{2}(target_{o1} - out_{o1})^2 + \frac{1}{2}(target_{o2} - out_{o2})^2$$

$$\omega_1^+ = w_1 - \eta * \frac{\partial E_{total}}{\partial w_1}; \quad \text{Equation (6)}$$

By assigning weights as described above, $w_1+$ may be finally calculated.

Step S411 will be described with reference to FIG. 8.

Figure 8:
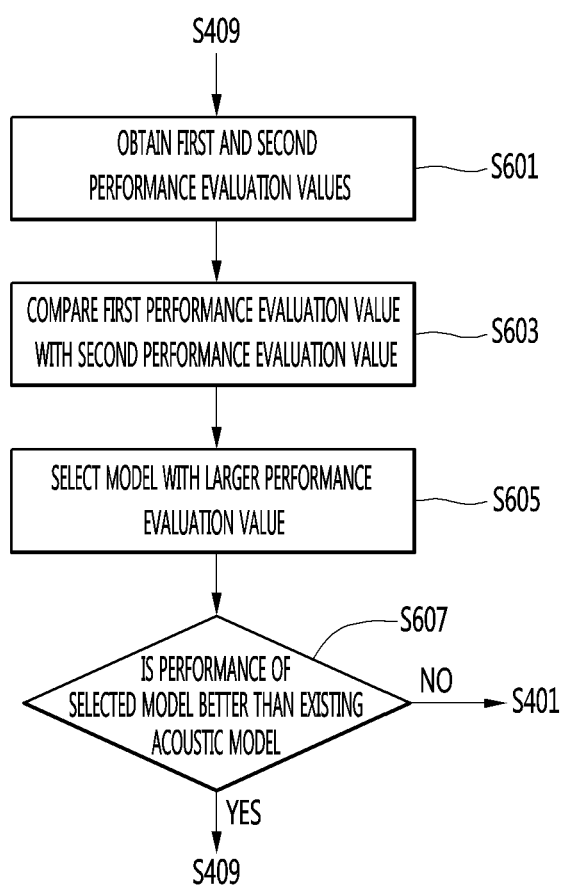
FIG. 8 is a diagram for describing a process of performing performance evaluation between a learning model and an adaptation model according to an embodiment of the present invention.

FIG. 8 is a diagram illustrating a process of performing performance evaluation between a learning model and an adaptation model according to an embodiment of the present invention.

Referring to FIG. 8, the performance estimation module 187 obtains a first performance evaluation value of the learning model and a second performance evaluation value of the adaptation model (S601).

In one embodiment, the performance estimation module 187 may include a first speech recognizer (not shown) that includes a learning model and a second speech recognizer (not shown) that includes an adaptation model.

The first speech recognizer may measure a first performance evaluation value indicating a degree of speech recognition with respect to the learning model.

The second speech recognizer may measure a second performance measure indicating a degree of speech recognition with respect to the adaptation model.

The performance estimation module 187 compares the first performance evaluation value with the second performance evaluation value (S603), and determines a model with a higher performance evaluation value as a model for determining whether to perform update among the training model and the adaptation model (S605).

The performance estimation module 187 determines whether the performance of the selected model is better than an existing acoustic model (S607).

In an embodiment, the performance estimation module 187 may compare the performance evaluation value of the selected model with a performance evaluation value of the existing acoustic model to determine whether the performance is improved.

The performance estimation module 187 may determine that the performance is improved when the performance evaluation value of the selected model is larger than the performance evaluation value of the existing acoustic model.

Description will be given referring again to FIG. 5. The performance estimation module 187 of the processor 180 updates the existing model according to a result of the evaluation of the speech recognition performance (S413).

In an embodiment, the performance estimation module 187 may select a model having a larger performance evaluation value from among the training model and the adaptation model.

The performance estimation module 187 may evaluate the performance between the selected model and the existing acoustic model.

Similarly, the performance estimation module 187 may compare the performance evaluation value of the selected model with the performance evaluation value of the existing acoustic model.

The performance estimation module 187 may update the existing acoustic model with the selected model when the performance evaluation value of the selected model is larger than the performance evaluation value of the existing acoustic model.

When the performance evaluation value of the selected model is smaller than the performance evaluation value of the existing acoustic model, the performance estimation module 187 may maintain the existing acoustic model without updating.

Figure 9:
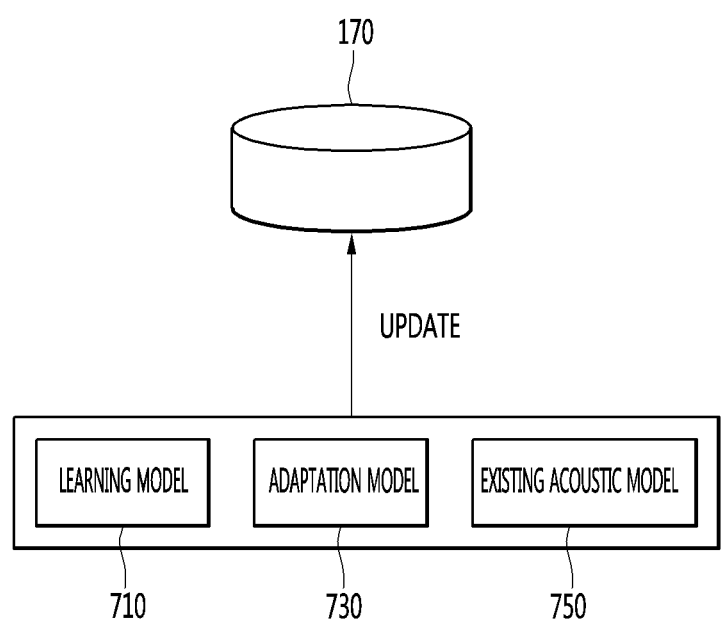
FIG. 9 is a diagram for describing a process of updating a model for speech recognition according to an embodiment of the present invention.

FIG. 9 is a diagram for describing a process of updating a model for speech recognition according to an embodiment of the present invention.

Referring to FIG. 9, the performance estimation module 187 of the processor 180 may evaluate the performance between a learning model 710 and an adaptation model 730.

Thereafter, the performance estimation module 187 may perform performance evaluation between the existing acoustic model 750 and a model with better performance among the learning model 710 and the adaptation model 730.

The performance estimation module 187 may update the existing acoustic model 750 with the new model in the memory 170 when the performance evaluation value of the model with better performance among the learning model 710 and the adaptation model 730 is larger than the performance evaluation value of the existing acoustic model 750.

The learning system 100 may transmit a new model to a separate speech recognition server through the wireless communication unit 110.

Figure 10:
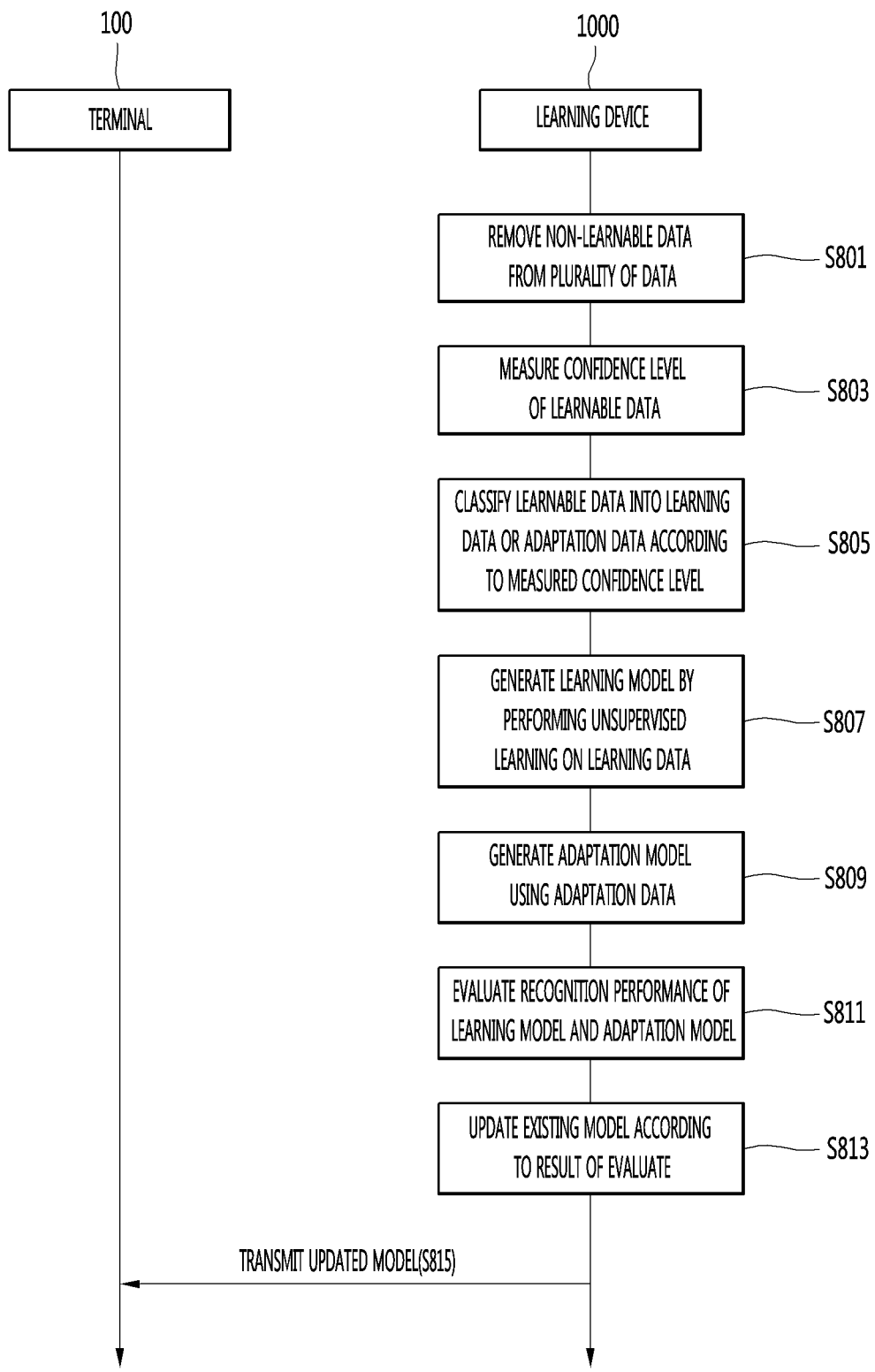
FIG. 10 is a ladder diagram for describing a method of operating a speech recognition system according to an embodiment of the present invention.

FIG. 10 is a ladder diagram for describing a method of operating a speech recognition system according to an embodiment of the present invention.

In particular, FIG. 10 is a diagram for describing a process of performing the steps described with reference to FIG. 5 by the learning apparatus 1000 described with reference to FIG. 1.

To this end, the processor 1020 of a learning apparatus 1000 may include a data selection module 181, a learning model 183, an adaptation module 185, and a performance estimation module 187, illustrated in FIG. 3.

Referring to FIG. 10, the processor 1020 of the learning apparatus 1000 removes non-learnable data from a plurality of pieces of data (S801).

After the non-learnable data is removed, the processor 1020 measures a confidence level of the remaining learnable data (S803).

The processor 1020 classifies the learnable data into learning data or adaptation data according to the measured confidence level (S805).

The processor 1020 performs unsupervised learning on the classified learning data to generate a learning model (S807).

The processor 1020 generates an adaptation model by using the classified adaptation data (S809).

The processor 1020 evaluates speech recognition performance of each of the learning model and adaptation model which are generated (S811).

The processor 1020 updates the existing model according to a value of the evaluation of the speech recognition performance (S813).

The processor 1020 transmits an updated acoustic model to the terminal 100 through a wireless communication unit (not shown) (S815).

According to the present invention having the configuration as described above, manual transcription process for speech data is not required, thus saving a lot of time and cost.

In addition, according to the present invention, it is possible to reduce the learning time by selectively using data, and improve the speech recognition in a real environment by using both a learning model and an adaptation model.

In addition, according to the present invention, it is possible to update the recognition model by applying weights for the confidence level to the learning model and the adaptation model.

The present invention described above may be embodied as computer readable codes on a medium in which a program is recorded. The computer-readable medium includes all kinds of recording devices in which data readable by a computer system is stored. Examples of computer-readable media include hard disk drives (HDDs), solid state disks (SSDs), silicon disk drives (SDDs), ROMs, RAMS, CD-ROMs, magnetic tapes, floppy disks, optical data storage devices, and the like. There is this. Further, the computer may also include a processor 180 of a terminal.

The present invention calculates the confidence level and HMM-state entropy for speech recognition results, selects the data accordingly, and performs learning in two ways (unsupervised learning and adaptation) to generate an improved model, thus improving speech recognition performance in real environment without human intervention and increase in learning time. In the case of such a learning model, it is possible to use the confidence level obtained from the data selection module as a weight of the model learning, instead of simply adding the data, and also estimating and updating the speech recognition performance using the confidence level for recognition result of the generated model, thus Improving the efficiency of acoustic model learning and a system managing process.

Although the present invention has been described in detail through the representative embodiments above, it will be understood by those skilled in the art that various modifications can be made to the above-described embodiments without departing from the scope of the present invention. Therefore, the scope of the present invention should not be limited to the embodiments described, but should be defined by all changes or modifications derived from the claims and the equivalents thereof.

What is claimed is:

1. A unsupervised learning apparatus for performing weighting for improvement in speech recognition performance, the apparatus comprising:

a memory configured to store speech data provided from a server that performs speech recognition; and
a processor configured to:
measure confidence levels of pieces of learnable data stored in the memory and classify the pieces of learnable data into learning data and adaptation data, according to the measured confidence levels,
generate a learning model by performing unsupervised learning on the learning data,
generate an adaptation model using the adaptation data, and
evaluate recognition performance for each of the learning model and the adaptation model,
wherein the processor is configured to assign weights by applying the measured confidence levels to the learning model and the adaptation model and update the recognition performance with the learning model and the adaptation model to which the weights are applied, and
wherein the processor is configured to:
calculate new learning data or new adaptation data by applying weights according to the confidence levels to the learning data or the adaptation data,
generate the learning model through the new learning data, and
generate the adaptation model through the new adaptation data.

2. The unsupervised learning apparatus of claim 1, wherein the processor is configured to:
classify the learnable data into the learning data when the confidence level of the learnable data is greater than or equal to a reference confidence level, and
classify the learnable data into the adaptation data when the confidence level of the learnable data is less than the reference confidence level.

3. The unsupervised learning apparatus of claim 1, wherein the processor is configured to:
select N pieces of data, each of which a hidden Markov model-state entropy is greater than a reference entropy, among learning data with a confidence level greater than or equal to the reference confidence level, where N is a number,
perform unsupervised learning by using the selected N pieces of data and previously-stored seed data, and
generate the learning model according to a result of the performance of the unsupervised learning.

4. The unsupervised learning apparatus of claim 2, wherein the processor is configured to generate the adaptation model using a generative adversarial network for adaptation data with a confidence level less than the reference confidence level.

5. The unsupervised learning apparatus of claim 1, further comprising:
a performance evaluation model configured to evaluate performance of the learning model and the adaptation model,
wherein the performance evaluation model
measures a first performance evaluation value indicating a number of successes of speech recognition in which the learning model is applied to logging speech data and a second performance evaluation value indicating a number of successes of speech recognition in which the adaptation model is applied to logging speech data, and
selects a model corresponding to a larger performance evaluation value of the first performance evaluation value and the second performance evaluation value among the learning model and the adaptation model.

6. The unsupervised learning apparatus of claim 5, wherein the processor is configured to:
compare a performance evaluation value of the selected model with a performance evaluation value of an acoustic model stored previously, and
update the acoustic model with the selected model when the performance evaluation value of the selected model is larger than the performance evaluation value of the acoustic model.

7. The unsupervised learning apparatus of claim 1, wherein the processor is configured to update a performance evaluation model with the learning model or the adaptation model to which the weights are applied.

8. A unsupervised learning method for performing weighting for improvement in speech recognition performance, the method comprising:
measuring confidence levels of pieces of learnable data of speech data received from a server that performs speech recognition and stored;
classifying the pieces of learnable data according to the measured confidence levels into learning data or adaptation data;
generating a learning model by performing unsupervised learning on the learning data and generating an adaptation model using the adaptation data; and
evaluating speech recognition performance for the learning model and the adaptation model,
wherein the unsupervised learning method further comprises:
assigning weights by applying the measured confidence levels to the learning model and the adaptation model; and
updating the speech recognition performance with the learning model or the adaptation model to which the weights are applied.

9. The unsupervised learning method of claim 8, wherein the evaluating of the speech recognition performance includes
measuring a first performance evaluation value indicating a number of successes of speech recognition in which the learning model is applied to logging speech data and a second performance evaluation value indicating a number of successes of speech recognition in which the adaptation model is applied to logging speech data, and
selecting a model corresponding to a larger performance evaluation value of the first performance evaluation value and the second performance evaluation value among the learning model and the adaptation model.

10. The unsupervised learning method of claim 9, further comprising:
comparing a performance evaluation value of the selected model with a performance evaluation value of an acoustic model stored previously; and
updating the acoustic model with the selected model when the performance evaluation value of the selected model is larger than the performance evaluation value of the acoustic model.

11. The unsupervised learning method of claim 8, wherein the classifying of the pieces of learnable data includes
classifying the learnable data into the learning data when the measured confidence level is greater than or equal to a reference confidence level, and
classifying the learnable data into the adaptation data when the measured confidence level is less than the reference confidence level.

12. The unsupervised learning method of claim 8, wherein the generating of the learning model includes
- selecting N pieces of data of which a hidden Markov model-state entropy is greater than a reference entropy, among learning data with a confidence level greater than or equal to the reference confidence level, where N is a number,
- performing unsupervised learning by using the selected N pieces of data and previously-stored seed data, and
- generating the learning model according to a result of performance of the unsupervised learning.

13. The unsupervised learning method of claim 8, wherein the generating of the adaptation model includes generating the adaptation model using a generative adversarial network for adaptation data with a confidence level less than the reference confidence level.

\* \* \* \* \*